May 13, 1941.  E. FRISCHKNECHT  2,241,548
INDICATING DEVICE
Filed March 26, 1938  4 Sheets-Sheet 1

INVENTOR
E. FRISCHKNECHT
BY
M J Reynolds
ATTORNEY

May 13, 1941.   E. FRISCHKNECHT   2,241,548
INDICATING DEVICE
Filed March 26, 1938          4 Sheets-Sheet 2

INVENTOR
E. FRISCHKNECHT
BY M. J. Reynolds
ATTORNEY

May 13, 1941.  E. FRISCHKNECHT  2,241,548
INDICATING DEVICE
Filed March 26, 1938    4 Sheets-Sheet 3

INVENTOR
E. FRISCHKNECHT
BY
M. J. Reynolds
ATTORNEY

May 13, 1941.  E. FRISCHKNECHT  2,241,548
INDICATING DEVICE
Filed March 26, 1938   4 Sheets-Sheet 4
FIG.12
FIG.11
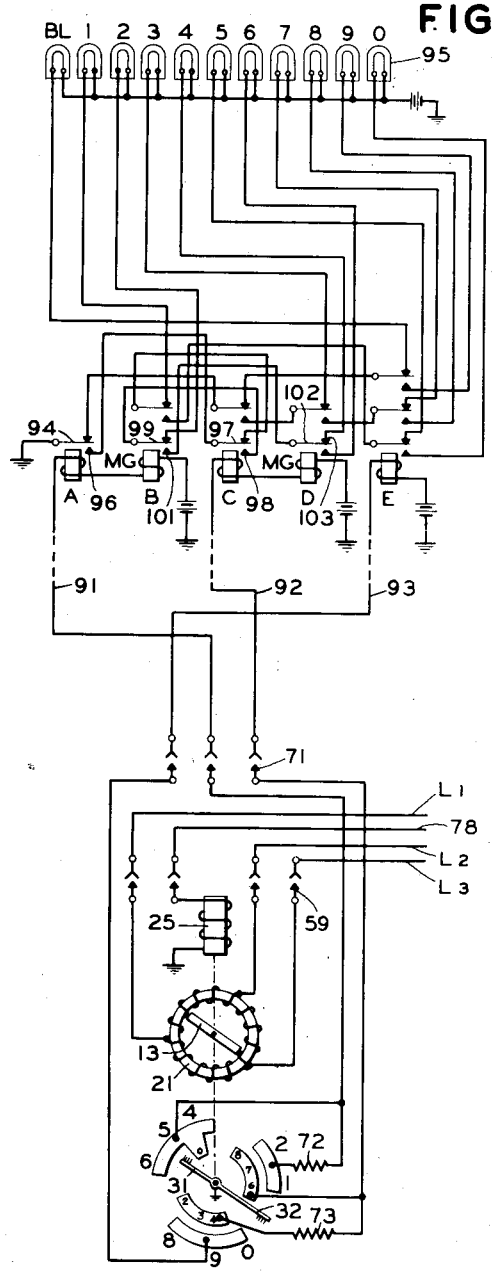
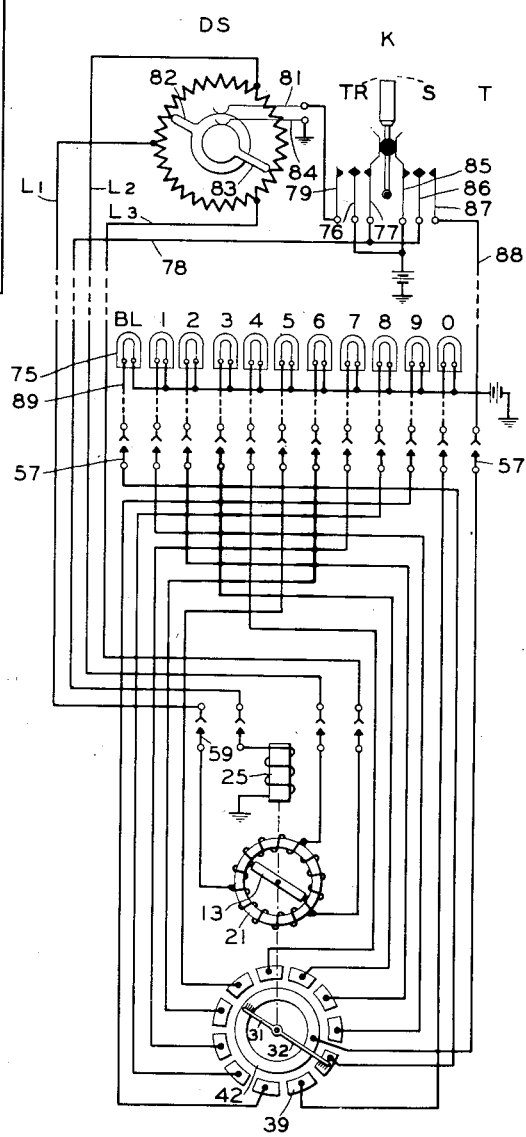
INVENTOR
E. FRISCHKNECHT
BY
M. J. Reynolds
ATTORNEY Patented May 13, 1941

2,241,548

UNITED STATES PATENT OFFICE 2,241,548

INDICATING DEVICE

Ernest Frischknecht, Jackson Heights, N. Y., assignor to The Teleregister Corporation, New York, N. Y., a corporation of Maryland Application March 26, 1938, Serial No. 198,222

11 Claims. (Cl. 177—337)

This invention relates to electromagnetically operated indicators adapted for use in automatic stock quotation boards and the like, and more particularly to an improved indicator unit in which a magnetic vane or armature is so mounted as to be rotatable to different predetermined angular positions by an electromagnetic field or fields produced by currents of variable strength and direction in the windings of an electromagnet.

In indicators of this type heretofore proposed, the considerable friction and inertia present in the moving parts, which had to be overcome when the settings of the indicator units were changed, rendered the same unsuitable for use in modern automatic stock quotation systems in which the indicators are required to operate accurately at very high speeds and on low voltage and low power.

An object to the invention is to obviate the foregoing disadvantages of the electromagnetic indicators heretofore proposed, and to provide an indicator of this type which will operate reliably at high speeds and on low voltage and low power, and which is sufficiently rugged to withstand the severe operating conditions encountered in service.

Another object is to provide means for moving the indicator directly from the old to the new setting by a signal comprising a single impulse, and disengaging the indicator drum from the armature during the setting operation of the armature and thereafter causing the drum to take a setting corresponding to the setting of the armature.

A further object of the invention is an indicator of the type disclosed which is adapted to retransmit signals for indicating at a distance the various settings of the indicator.

Another object is an indicating and retransmitting device having a bank of contacts and coacting brushes in which there is no frictional load imposed by the brushes while the device is taking a new setting; more specifically, the arrangement disclosed permits the angular setting of the indicator drum to take place with the brushes disengaged from their associated contacts, and separate means are employed to mark or make contact with the contacts whenever the setting or stored digit is required to be taken off for comparison, checking, or retransmission to actuate other groups of indicators.

An additional object is a simple and inexpensive transmitting mechanism for controlling the operation of a signal storage device by means of a single impulse, and controlling the device to cause it to retransmit a signal representative of the setting thereof.

Other objects of the invention will appear from the following description taken in connection with the accompanying drawings in which:

Fig. 11 is a circuit diagram of one embodiment of the invention; and

Fig. 12 is a circuit diagram of another embodiment of the invention.

Figure 2:
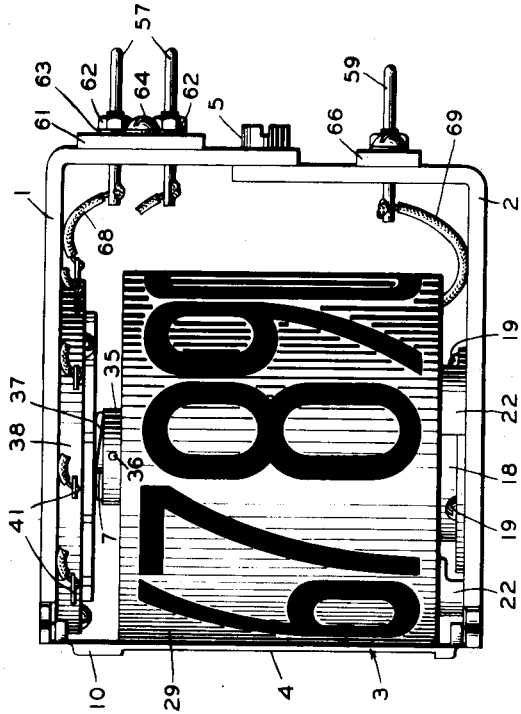
Fig. 2 is a side view of the device of Fig. 1.

Referring now to the drawings specifically, in which like numerals of reference are employed to designate like parts throughout the several views, the numeral 1 is employed to designate the upper portion of the housing and the numeral 2 the lower portion of the housing.

Figure 1:
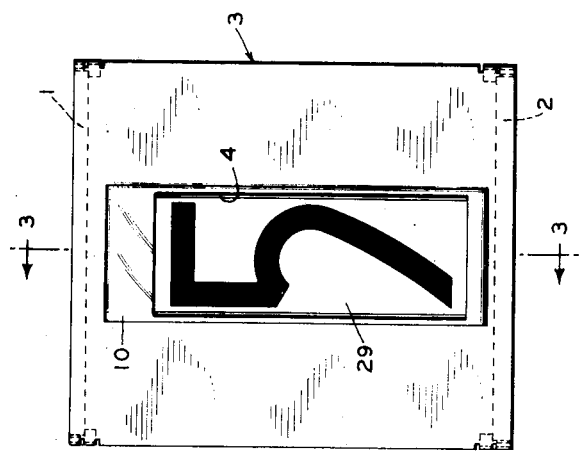
Fig. 1 is a front view of the device.
Figure 9:
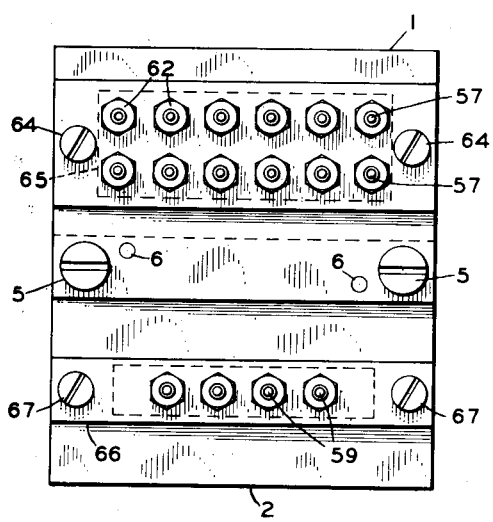
Fig. 9 is an end view of the device employing the distributor of Fig. 7.

Referring to Fig. 1 of the drawings, the housing has attached thereto a mask 3 provided with an aperture 4 through which the settings of the indicator are displayed. The upper and lower portions of the housing are secured together in any suitable manner such as by means of the screws 5 and held in alignment with each other by any well known method as for example by means of the dowel pins 6, Figs. 9 and 10.

Figure 5:
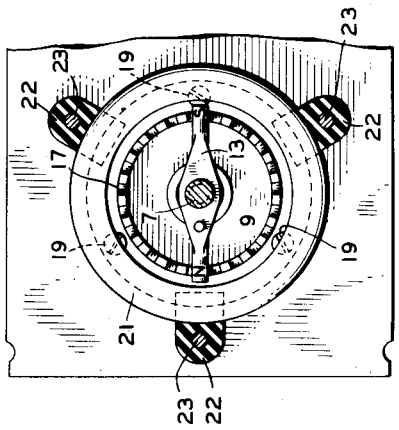
Fig. 5 is a view taken along the line 5—5 of Fig. 3.
Figure 6:
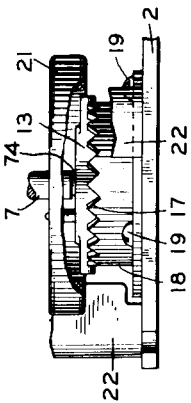
Fig. 6 is a side view of the device of Fig. 5.
Figure 3:
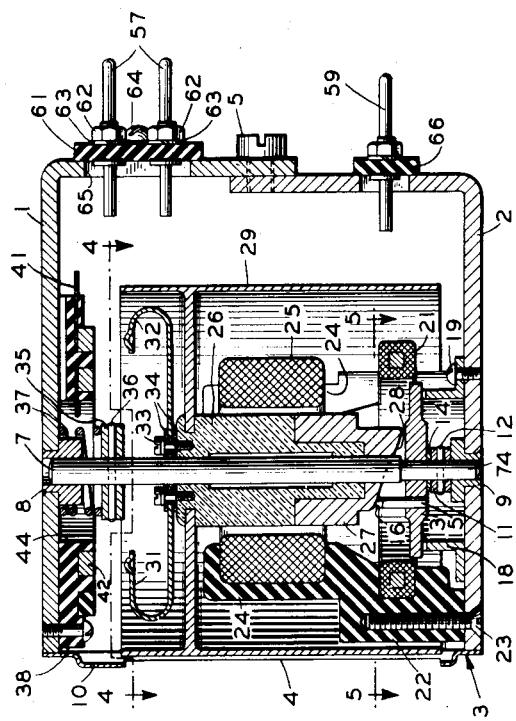
Fig. 3 is a sectional view taken along the line 3—3 of Fig. 1.

The indicator is provided with a rotatable shaft 7 mounted in the bearings 8 and 9, Fig. 3, secured to the upper frame 1 and lower frame 2, respectively. The shaft 7 has a thrust collar 11 secured thereto in any suitable manner as for example, by means of a pin 12 passing through the thrust collar and engaging the shaft. The thrust collar 11 is normally in contact with the bearing 9 whereas during the operation of the device the thrust collar is moved away from the bearing 9 as will be hereinafter explained in greater detail. A magnetized armature 13, which is a permanent magnet having north and south poles N and S, Fig. 5, in the illustrative embodiment illustrated, is pivotally mounted on the shaft and separated from the thrust collar by the washer 14. The armature is of small mass and low inertia, and preferably of less cross-section at the extremities than at the center portion thereof and provided with a pin 15 having a tapered end 16. With the shaft in the position shown on the drawings, the armature is restrained from movement by engagement with the serrated portion 17 of the ring 18, Fig. 6. In the specific embodiment shown, the indicator is adapted to take 11 different settings and the locking ring 18 is provided with 22 serrations 17 for preventing rotative movement of the armature 13 when set in any of the 11 positions thereof, the number of serrations in the locking ring being double the number of settings that the indicator is capable of taking. The ring 18 is secured to the housing 2 by the screws 19. A toroidal coil 21 is mounted in adjacent relationship to the armature 13 by the mounting pieces 22 which are attached to the housing 2 by the screws 23. The mounting pieces 22 are provided with a recessed portion 24 adapted to support the solenoid 25. A sleeve 26 of non-magnetic material is pivotally mounted on the shaft 7 and provided with a portion 27 of iron or other magnetic material adapted to be moved upward when the solenoid 25 is energized.

Figure 7:
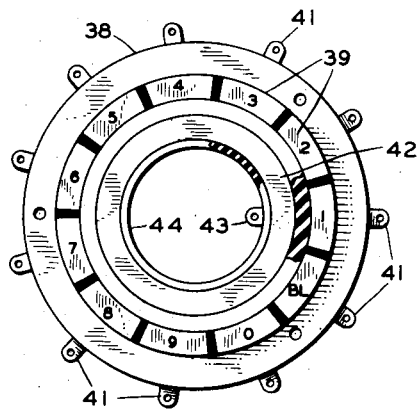
Fig. 7 shows one form of distributor which may be employed with the device of Fig. 1.

The portion 27 is provided with a cam surface 28 which engages the pin 15 when the solenoid 25 is deenergized, and causes the sleeve 26 and the members secured thereto to take a setting in accordance with the setting of the armature 13. A cylindrical drum 29 is secured to and supported by the sleeve 26 and provided with a series of indicia for indicating the settings of the device. The drum may be made of any suitable material such as metal or molded composition and of sufficient thickness to maintain its circular shape. The wiper arms 31 and 32 are secured to the sleeve 26 by the screws 33 and insulated therefrom by the insulating washers 34. The shaft 7 is also provided with a thrust washer 35 fixed thereon by the pin 36. A spring 37 presses against the thrust washer 35 to cause the shaft to move downward quickly when the solenoid 25 is deenergized. A distributor 38 is provided with a plurality of conducting segments for engaging the wiper arms 31 and 33 when the wipers have been raised sufficiently by the solenoid 25. The distributor may be as shown on Fig. 7 or 8, the distributor of Fig. 7 having a conducting segment 39 for each of the settings of the device, each of the segments being provided with a terminal 41 and adapted to be engaged by the wiper 32. The distributor is also provided with a feeder ring 42 adapted to be engaged by the wiper 31 and in electrical connection with the terminal 43. The distributor is preferably provided with an opening 44 through which the shaft 7 passes.

Figure 8:
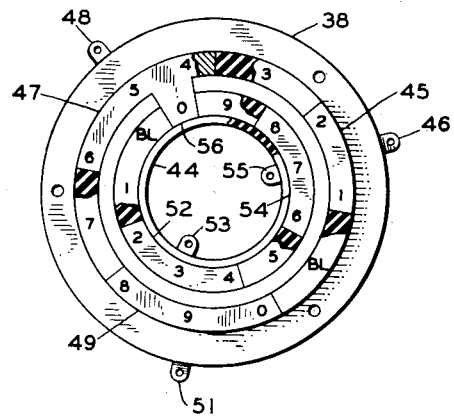
Fig. 8 is another form of distributor which may be employed with the device.

The distributor of Fig. 8 comprises two series of conducting segments, each series adapted to engage the wipers 31 and 32 in accordance with the setting of the device. The segment 45 is in electrical circuit with the terminal 46. The segment 47 is connected to the terminal 48 and the segment 49 is connected to the terminal 51, the segments 45, 47 and 49 comprising one series adapted to be engaged by the wiper 32. The segment 52 is connected to the terminal 53. The segment 54 is connected to the terminal 55 and the segment 56 is in electrical circuit with the segment 47. Segments 52, 54 and 56 are engaged by the wiper 31. The distributor is also provided with an opening 44 in the manner of the distributor of Fig. 7. The numerals appearing on the segments of the distributors of Figs. 7 and 8 indicate the settings of the device when these segments are engaged by their respective wipers.

Referring now to Figs. 2 and 3, there is shown thereon at the rear of the unit a plurality of slip connection terminals 57 and 59. The terminals 57 are insulated from one another and from the housing by the insulating strip 61, the terminals being secured to the strip by the nuts 62 and washers 63 and the strip is held against the frame by the screws 64. The frame is provided with an aperture 65 through which the terminals 57 pass without coming into contact with the housing 1. The terminals 59 are mounted on and insulated from one another and the housing 2 by the insulating strip 66 secured to the lower housing 2 by the screws 67. The terminals 57 are connected to the terminals of the distributor of Fig. 7 or Fig. 8, as the case may be, by the conductors 68, Fig. 2, and the terminals 59 are connected to the windings of the coil 21 and solenoid 25 by the conductors 69. This construction provides means for readily adapting the device for use with a signal system employing a step-by-step code for actuating the selected signal means in a system wherein the signal means is actuated by a permutation code, by merely interchanging the upper housing 1 with the upper housing 70 of Fig. 10. The housing 1 supports the distributor of Fig. 7, the terminals of which are wired to the slip connections 57, and the housing 70 supports the distributor of Fig. 8, the terminals of which are connected to the slip connections 71 and the resistor elements 72 and 73.

The operation of the device will best be understood by consideration of a specific example. Assume that the device has taken a setting to display the digit 5 as shown on Fig. 1 and it is desired to change the setting thereof to post the digit 7. The solenoid 25, Fig. 3, is first energized thereby drawing the ferric portion 27 of the sleeve 26 upwardly and causing the drum to move upwardly until the screws 33 come into contact with the thrust washer 35 and thereby move the shaft 7 against the pressure of the spring 37 sufficiently to cause the wipers 31 and 32 to engage the segments of the distributor. As the shaft 7 moves upward it carries with it the thrust collar 11 and washer 14, thus moving armature 13 out of engagement with the locking ring 18 and into the field of the toroidal coil 21. The toroidal coil is now energized over a circuit including the three conductors connected thereto in such a manner as to set up a resultant field which causes the magnetized armature 13 to move quickly about the shaft 7 into alignment with this field thereby to cause the indicator to display the digit 7 as will be explained in greater detail as the description proceeds. It will be recalled that during the movement of the armature from the position 5 to the position 7, in the assumed example, the cam surface 28 has been moved out of engagement with pin 15 thereby enabling the armature 13 to take a new setting in a substantially instantaneous manner regardless of the inertia of the drum assembly.

The solenoid 25 is then deenergized, causing the shaft 7 to be moved axially until the thrust collar 11 comes into contact with the bearing 9, which movement is accomplished very quickly by the action of the spring 37. The shoulder 74 of the shaft carries with it the armature 13 thereby bringing the armature into engagement with the locking ring 18 and maintaining the armature in the set position. The drum 29 continues to move axially until the cam surface 28 engages the tapered end 16 of the pin 15, when the further axial movement of the drum is accompanied by a rotary movement thereof due to the pressure on the cam. This rotary movement is continued until the drum has taken the setting corresponding to the position of the armature which, in the assumed example, is the setting to display the digit 7.

Referring now to Fig. 11 of the drawings there are shown thereon the circuits and apparatus employed to indicate by means of a signal device the setting of the indicator at a remote point. In this embodiment of the invention the indicator is provided with the distributor of Fig. 7 comprising a plurality of conducting segments 39, each of which is connected through slip connections 57 to a lamp 75 or other signal device for giving a signal at a remote point indicative of the setting of the device. The indicator is remotely controlled by a transmitter T comprising a key K and a settable device DS which, in the present embodiment of the invention, is shown as a dial switch settable to different positions in accordance with the digit to be transmitted, thereby to place battery and ground potentials on opposite points of a continuous resistance element in accordance with the digit signal to be transmitted. It will be understood that the dial switch may be replaced by a strip of keys for closing circuits from battery and ground to the different points on the resistor element and such an arrangement is contemplated in the present invention.

The operation of the system of Fig. 11 will now be described. When it is desired to change the setting of the indicator, the dial switch DS is moved to the appropriate position and the key K operated to the side TR to transmit the digit signal. When this occurs a circuit is closed from battery at the contact 76 of the key K through a contact 77 and conductor 78, through the slip connection 59 to the grounded winding of the solenoid 25, thereby energizing the solenoid and causing the armature 13 and wiper arms 31 and 32 to be moved upwardly. The armature 13 is thus disengaged from the locking ring 18 and is now free to rotate as the movement of the wiper arms upward caused the drum to be disengaged from the pin 15 of the armature. As spring 79 was brought into engagement with spring 76 of the key K, battery was placed on the wiper spring 81 of the switch DS, the wiper 82 thereof, lines L1, L2 and L3 in different degrees of potential depending upon the position of the wipers of the switch DS from whence the circuit is traced through the windings of the toroidal coil of the storage indicator, the circuit being completed by the wiper 83 to the grounded wiper spring 84 of the switch DS. The resultant field of the coil 21 caused the armature 13 to take a setting corresponding to the setting of the dial switch DS.

The key K is restored to the normal position shown on the drawings, thereby removing the battery potential at the spring 76 from the line 78 and the solenoid 25, and causing the armature 13 to engage the locking ring and the drum to take the position of the armature and thus post the digit set up by the dial switch. The restoration of the key K also removes battery from the toroidal coil 21.

When it is desired to obtain a signal at a remote point indicative of the setting of the storage indicator, the key K is moved toward the side S, thereby causing the spring 85 to engage the spring 86 of the key and apply battery potential to the conductor 78, thus energizing the solenoid 25 and causing the wipers 31 and 32 to engage the distributor and operate a signal over the following circuit: Battery, springs 85, 86 and 87 of the key K, conductor 88, slip connection 57, feeder ring 42, brushes 31 and 32, one of the segments 39, thence through another of the slip connections 57, one of the conductors 89 and thence through the appropriate signal lamp to ground causing the lamp to give a signal in accordance with the setting of the storage indicator. When the key K is restored to normal position, battery is removed from the conductor 78 thereby de-energizing the solenoid 25 and disengaging the wipers 31 and 32 from the distributor without changing the setting of the storage indicator.

Figure 4:
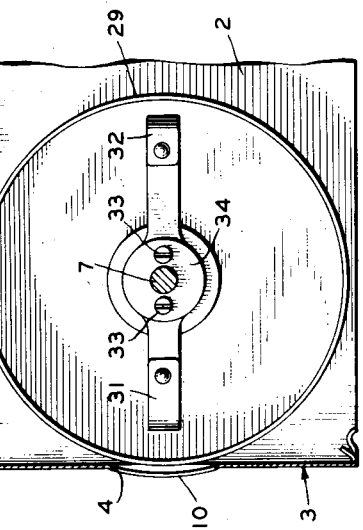
Fig. 4 is a view taken along the line 4—4 of Fig. 3.

Referring to Figs. 3 and 4, it will be noted that the mask 3 is provided with an offset portion 10 behind which the upper portion of the drum is moved as the drum is raised, thereby to improve the appearance of the storage indicator unit and to prevent dirt and other foreign material from readily entering the unit through the aperture in the mask. The lower edge of the portion 10 is substantially in alignment with the upper edge of the drum in such a manner as to not obscure any portion of the displayed digit when the drum is in the normal position.

Figure 10:
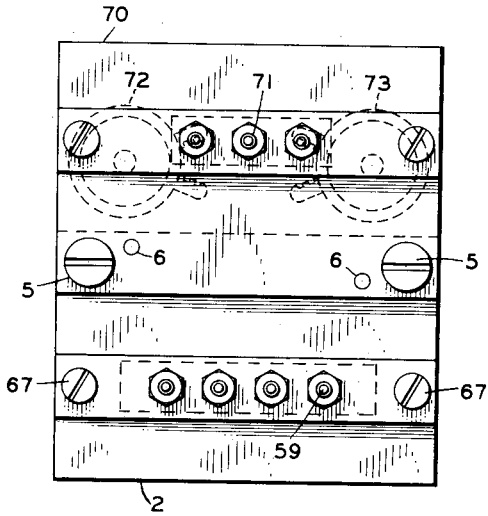
Fig. 10 is an end view of the device employing the distributor of Fig. 8.

Referring now to Fig. 12, the storage indicator shown thereon is provided with the distributor of Fig. 8 mounted within the upper housing 70 of Fig. 10, the wipers 31 and 32 being grounded as by replacing one or both of the insulating washers 34 by metal washers. The lines L1, L2, L3 and the conductor 78 extending to the right of the figure may be connected to the correspondingly designated circuits of the transmitter T and the operation of the storage indicator unit of Fig. 12 may be controlled from the transmitter T in a manner similar to the storage indicator of Fig. 11. The control of this indicator by the transmitter T will therefore not be described in detail. It will be noted, however, that whereas a plurality of signal conductors equal in number to the number of positions of the storage indicator were employed in the arrangement of Fig. 11 for operating the signal lamps 75 to indicate the setting of the device, but three conductors are required with the arrangement of Fig. 12. These conductors are connected to the slip connections 71 of the upper housing 70 of the storage indicator in the manner indicated on the drawings and control the operation of the decoding relays A to E, of which the relays B and D are marginal relays. Relays A and B are connected in series with the conductor 91, relays C and D are connected in series with the conductor 92 and relay E is connected to the conductor 93. The conductor 91 is continued through one of the slip connections 71 to a segment adapted to be engaged by the wiper 32 when the storage indicator has taken settings corresponding to the digits 4, 5 and 6, and through the resistance 72 to another segment engaged by the wiper 32 in positions 1 and 2. Conductor 92 is connected through another of the slip connections 71 to a segment engaged by the wiper 31 in positions 6, 7 and 8, and through the resistance 73 to another segment engaged by the wiper 31 in positions 2, 3 and 4. The conductor 93 is connected through still another of the slip connections 71 to a segment engaged by the wiper 32 in positions 8, 9 and 0 thereof. The wipers 31 and 32, when brought into contact with the distributor by the operation of the solenoid 25, apply ground to certain of the conductors 91, 92 and 93 either directly or through the resistors 72 and 73 in accordance with the setting of the brushes. When ground is applied directly to conductor 91, relays A and B both operate, but when ground is applied through the resistance 72 to conductor 91, the relay A operates and the relay B, being marginal, does not operate. Similarly, ground applied directly to conductor 92 causes the operation of relays C and D, but, when applied through the resistance 73, the relay C operates and the marginal relay D remains unoperated. Whenever the grounded brush 32 is brought into contact with the distributor in positions 8, 9 and 0 of the storage indicator, ground is applied to conductor 93 and the relay E operates.

The contacts of the relays A, B, C, D and E are connected in series chain relationship whereby ground at the armature 94 of relay A is extended through the contacts of other of these relays to the appropriate one of the signal devices 95 in accordance with the setting of the storage indicator. If, for example, the storage indicator is set to display the digit 4, the operation of the solenoid 25 causes the wiper 32 to ground the conductor 91 and operate relays A and B and the wiper 31 to ground the conductor 92 through the resistance 73 and operate relay C. With relays A, B and C operated, a circuit is completed from the grounded armature 94 and make contact 96 of relay A, armature 97 and make contact 98 of relay C, armature 99 and make contact 101 of relay B, armature 102 and break contact 103 of relay D through the signal lamp 4 and thence to the battery causing the lamp 4 to be lighted as a signal that the storage indicator is set to display the digit 4.

From the foregoing it is clear that relays A, B, C, D and E will assume a setting in accordance with the position of the wipers 31 and 32 when the solenoid 25 is operated. The circuits through the contacts of these relays to different ones of the lamps 95 are simple series circuits and will therefore not be traced in detail. It will be noted, however, that the arrangement of Fig. 12 provides a distributor for transmitting a permutation code signal over a plurality of conductors less in number than the settings of the distributor to a group of decoding relays which may be remotely situated with respect to the transmitting distributor of the storage device, and the system includes a plurality of signal devices actuated by the decoding relays and controlled by the settings of the storage device for indicating at a remote point the settings of the device. For example they may be situated at the transmitter T for checking the operation of the system.

While the invention has been described in detail with respect to certain preferred examples thereof which give satisfactory results, it will be understood by those skilled in the art to which the invention pertains or with which it is most nearly connected, that various changes and modifications may be made without departing from the spirit and scope of the invention and it is intended therefore in the appended claims to cover all such changes and modifications.

What is claimed as new and desired to be secured by Letters Patent is:

1. An indicator comprising a framework having a shaft, a settable indicia bearing element mounted on said shaft, electromagnetic means including a permanent magnet mounted on said shaft for operating the indicator, means for setting the permanent magnet to different positions respectively corresponding to a plurality of different settings of the indicia bearing element, a cam element carried by said permanent magnet, a complementary cam element secured to said indicia bearing element, electromagnetic means for moving said indicia bearing element away from the permanent magnet thereby to disengage the cam elements during movement of the permanent magnet to a different position, means for maintaining the permanent magnet in any of the set positions thereof, and means for thereafter bringing the cam elements into operative relationship with each other to cause the indicia bearing element to take a setting corresponding to the setting of said permanent magnet.

2. An indicator unit comprising a shaft, a rotatable drum having a series of characters thereon and settable to different positions to display selected ones of said characters, an electromagnet, a permanently magnetized armature mounted on said shaft and freely rotatable relative to the shaft and settable by said electromagnet to different positions respectively corresponding to a plurality of different settings of the rotatable drum, locking means for maintaining the armature in any of the set positions thereof, means comprising cam elements operatively associated with said armature and rotatable drum for setting said drum in accordance with the set position of the armature, and means including electromagnetic means for disengaging said armature from its locking means and means for disengaging said cam elements thereby to enable unobstructed movement of the armature while the armature is taking its setting and for thereafter engaging the cam elements to cause said drum to take a setting in accordance with the setting of the armature.

3. A device for indicating any one of a plurality of characters comprising a frame having an upper and lower portion, means for detachably securing said portions of the frame together, electromagnetic means including slip connections for operating the device secured to the lower portion of the frame, means including a plurality of slip connections secured to the upper portion of the frame operable in accordance with the setting of the device and means for automatically indicating the setting of the device at a remote point under control of said plurality of slip connections without changing the setting of the device.

4. In a device for posting stock quotations and the like, a shaft, a settable drum having a series of characters thereon slidably mounted on said shaft and settable to different positions to display selected ones of said characters, a magnetized armature pivotally mounted on said shaft and settable to different positions respectively corresponding to said different positions of the settable drum, means carried by said armature for mechanically locking the armature in any of its set positions, electromagnetic means for moving said armature into any of its different set positions, means including an electromagnet for disengaging the drum from the armature during movement of the armature to a new setting, means for disengaging the armature from its locking means, means for moving the armature to a different setting, and means including cam elements operatively associated with said drum and armature for causing the drum to be set in a position corresponding to the new setting of the armature.

5. In an indicating storage device having a magnetized armature settable to different positions, means engageable with said armature for locking the armature in any one of the set positions, electromagnetic means for maintaining the armature out of engagement with said locking means during the movement of said armature to a new setting, a rotatable drum for indicating the setting of the device, a shaft for mounting said armature and said drum whereby the armature is pivotally mounted thereon and the drum pivotally and slidably mounted thereon, and means for moving the drum out of engagement with the armature during the time the armature is set to a new position and for thereafter causing the drum to assume the setting of the armature.

6. In an indicating device for posting stock quotations and the like, circuit means including an electromagnet for setting the device in any of a plurality of different positions in accordance with the information to be posted, a magnetized armature operated by said electromagnet and settable to different positions respectively corresponding to the different positions to which said indicating device is settable, means for locking the armature in any of its set positions, a rotatable character carrying drum assembly normally in operative relationship with said armature, electromagnetic means for moving the drum assembly out of operative relationship with the armature while the armature is taking a new setting, and means carried by said armature for causing the drum assembly to move in either direction and take a setting corresponding to the position of the armature after the position of the armature has been set.

7. An indicating device for setting up information in numerical form, comprising a shaft, rotatable means including an electromagnet for storing electric signals representative of the quotation, a character carrying member settable to different positions and mounted on said shaft and having a cam element secured thereto, a complementary cam element secured to said rotatable means and coacting with the first named cam element to set said character carrying member in any of said plurality of positions, locking mechanism for said rotatable means, means including an electromagnet for moving the character carrying member away from the rotating member, means actuated by the movement of said character carrying member for disengaging said rotating member from said locking means until the rotating member has taken its setting, and means for thereafter causing the rotating member to engage said locking means and the character carrying member to take a setting corresponding to the setting of said rotating means.

8. In an indicating device the combination of indicator operating means settable to different positions, an indicia bearing member settable to different positions corresponding to the settings of said operating means, means including a circuit for causing said operating means to move continuously in either direction to a new setting, and means including cam surfaces operatively associated with said operating means and indicia bearing member for thereafter causing the indicia bearing member to move continuously in either direction to take a setting corresponding to the setting of the said operating means, said cam surfaces remaining in engagement with each other for maintaining the indicia bearing member in its new setting until said operating means again is effective to actuate the indicia bearing member to another setting.

9. In a device for posting stock quotations and the like, the combination of a rotatable drum having a series of indicating elements thereon, a shaft for said drum, a magnetized armature pivoted on said shaft, operating means for setting said armature in any position thereof, locking means for said armature, means including an electromagnet, and means including cam surfaces operatively associated with said drum and armature for causing the drum to take the setting of the armature, all of the said means being confined within said drum.

10. The combination of an indicating mechanism comprising a rotatable drum having a series of characters thereon, a mask having an aperture therein for exposing the characters corresponding to the settings of the drum, means including an electromagnet and a rotatable armature for moving the drum to different settings thereof, means including said armature for retaining the drum in any set position, means including a second electromagnet for making said retaining means ineffective while said drum moving means is operating, said last named means causing movement of the drum in a direction of the axis thereof, and means included in the mask for covering that portion of the drum moved beyond the normal position thereof without obscuring any part of the displayed character when the drum is returned to the normal position.

11. An indicator comprising a rotatable indicating device selectively settable to a plurality of different positions, means for selectively rotating said indicating device to said settable positions comprising a first electromagnet including a rotatably mounted armature adapted to take different settings respectively in accordance with the different indicating positions of the indicating device and coacting cam members carried by said indicating device and rotatable armature, respectively, for causing the indicating device to take settings in accordance with the settings of the armature when said cam members are in engagement with each other, a second electromagnet having an armature secured to and rotatable with said indicating device for moving the indicating device, under control of said second electromagnet, to a position such that the cam member of said indicating device is disengaged from the cam member of said first named armature, means for energizing said second electromagnet to cause disengagement of said cams when rotating said first armature to a new setting, means for energizing said first electromagnet to cause said first armature to take a desired new setting during the time that said second electromagnet is energized thereby to enable unobstructed movement of said first armature in taking its new setting, means for thereafter deenergizing said second electromagnet to cause the cam member of said indicating device to engage the cam member of said armature for rotating the indicating device to a setting in accordance with the setting of said armature, and means for locking said armature against rotary movement during the said rotation of the indicating device.

ERNEST FRISCHKNECHT.